United States Patent
Grant et al.

(10) Patent No.: US 8,041,725 B2
(45) Date of Patent: Oct. 18, 2011

(54) ELIMINATING DUPLICATE AND INVALID CALENDAR ITEMS FROM END USER CALENDARS USING A UNIQUE ENTRY IDENTIFIER (UEID)

(75) Inventors: Shayne M. Grant, Raleigh, NC (US); Daniel L. Krissell, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 560 days.

(21) Appl. No.: 12/145,861

(22) Filed: Jun. 25, 2008

(65) Prior Publication Data
US 2009/0327919 A1 Dec. 31, 2009

(51) Int. Cl.
*G06F 17/30* (2006.01)
*G06F 3/00* (2006.01)

(52) U.S. Cl. .................. 707/758; 707/754; 715/751
(58) Field of Classification Search ............. 707/999.3, 707/754, 758, 769; 715/751; 709/220
See application file for complete search history.

(56) References Cited

U.S. PATENT DOCUMENTS

| | | | | |
|---|---|---|---|---|
| 4,807,154 A | * | 2/1989 | Scully et al. ................. | 715/751 |
| 4,819,191 A | * | 4/1989 | Scully et al. ................. | 715/751 |
| 4,831,552 A | * | 5/1989 | Scully et al. ................. | 715/751 |
| 5,023,851 A | * | 6/1991 | Murray et al. ................. | 368/41 |
| 5,070,470 A | * | 12/1991 | Scully et al. ................. | 708/112 |
| 5,261,045 A | * | 11/1993 | Scully et al. ................. | 715/751 |
| 5,706,475 A | * | 1/1998 | Entressangle et al. ........ | 709/203 |
| 5,727,202 A | * | 3/1998 | Kucala ................. | 1/1 |
| 5,884,323 A | * | 3/1999 | Hawkins et al. ....... | 1/1 |
| 6,058,415 A | * | 5/2000 | Polcyn ............ | 709/200 |

(Continued)

FOREIGN PATENT DOCUMENTS
EP 1-868-147 A1 * 12/2007

OTHER PUBLICATIONS
Soo, Michael D., et al., "The MultiCal Project: Architectural Extensions to Support Multiple Calendars", Dept. of Computer Science, Univ. of Arizona, Tucson, AZ, Oct. 1993, 82 pages.*

(Continued)

*Primary Examiner* — Robert Stevens
(74) *Attorney, Agent, or Firm* — Patents on Demand, P.A.; Brian K. Buchheit; Scott M. Garrett

(57) ABSTRACT

Providing a unique entry identifier, which is an identifier specific to a calendar entry. The calendar entry can be an entry associated with a set of different electronic calendars, each associated with a specific user. Data for each user specific calendar can be stored in a structured data store. A set of records for each user specific calendar can be maintained and utilized independent of other sets of records associated with other ones of the users. The unique entry identifier can be an identifier unique for the calendar entry within the associated set of records, and wherein the same unique entry identifier is utilized for the calendar entry within each of the different sets of records as a unique identifier for the calendar entry. For example, when calendar updates are conveyed via email among a set of users, shared meetings can always be associated with a unique entry identifier used by all calendaring systems.

18 Claims, 2 Drawing Sheets

U.S. PATENT DOCUMENTS

| | | | |
|---|---|---|---|
| 6,108,640 A * | 8/2000 | Slotznick | 705/7.18 |
| 6,457,062 B1 * | 9/2002 | Pivowar et al. | 709/248 |
| 6,480,830 B1 * | 11/2002 | Ford et al. | 705/9 |
| 6,604,079 B1 * | 8/2003 | Ruvolo et al. | 705/7.15 |
| 6,785,868 B1 * | 8/2004 | Raff | 715/205 |
| 6,879,996 B1 * | 4/2005 | Laves | 709/206 |
| 6,934,740 B1 * | 8/2005 | Lawande et al. | 709/213 |
| 7,035,878 B1 * | 4/2006 | Multer et al. | 1/1 |
| 7,149,810 B1 * | 12/2006 | Miller et al. | 709/246 |
| 7,213,039 B2 * | 5/2007 | Ramanujam et al. | 1/1 |
| 7,283,831 B2 * | 10/2007 | Caldini et al. | 455/466 |
| 7,299,240 B1 * | 11/2007 | Crozier | 1/1 |
| 7,584,412 B1 * | 9/2009 | Raff | 715/203 |
| 2002/0140733 A1 * | 10/2002 | Edlund et al. | 345/764 |
| 2003/0018816 A1 * | 1/2003 | Godfrey et al. | 709/246 |
| 2003/0050910 A1 * | 3/2003 | Ramanujam et al. | 707/1 |
| 2003/0200272 A1 * | 10/2003 | Campise et al. | 709/206 |
| 2005/0278641 A1 * | 12/2005 | Mansour et al. | 715/749 |
| 2006/0095859 A1 * | 5/2006 | Bocking et al. | 715/764 |
| 2006/0165222 A1 * | 7/2006 | Polcyn | 379/3 |
| 2006/0247961 A1 * | 11/2006 | Klemow | 705/8 |
| 2007/0016646 A1 * | 1/2007 | Tendjoukian et al. | 709/206 |
| 2007/0061330 A1 * | 3/2007 | Newton et al. | 707/10 |
| 2007/0079260 A1 * | 4/2007 | Bhogal et al. | 715/963 |
| 2007/0294370 A1 * | 12/2007 | Fay et al. | 709/219 |
| 2008/0027955 A1 * | 1/2008 | May et al. | 707/100 |
| 2008/0040188 A1 * | 2/2008 | Klausmeier | 705/9 |
| 2008/0059618 A1 * | 3/2008 | May et al. | 709/223 |
| 2008/0141247 A1 * | 6/2008 | Saravanan | 718/100 |
| 2008/0155547 A1 * | 6/2008 | Weber et al. | 718/102 |
| 2008/0177745 A1 * | 7/2008 | Eldering et al. | 707/10 |
| 2008/0178110 A1 * | 7/2008 | Hill et al. | 715/771 |
| 2008/0235287 A1 * | 9/2008 | Bocking et al. | 707/104.1 |
| 2009/0019107 A1 * | 1/2009 | Lance et al. | 709/203 |
| 2009/0089342 A1 * | 4/2009 | Runstedler et al. | 707/204 |

OTHER PUBLICATIONS

Sheshagiri, Mithun, et al., "Using Semantic Web Services for Context-Aware Mobile Applications", Proc. of Mobisys 2004 Workshop on Context Awareness, Jun. 2004, pp. 1-7.*

The American Heritage College Dictionary, 4th Edition, Houghton Mifflin Co., Boston, MA, © 2002, p. 1260.*

Neibauer, Alan, Running Microsoft Outlook 2000, Microsoft Press, Redmond, WA, © 1999, pp. 74-76, 336-346, 665 and 674-675.*

Dusseault, Lisa, et al., "Open Calendar Sharing and Scheduling with CalDAV", IEEE Internet Computing, Mar.-Apr. 2005, pp. 81-89.*

Bloodworth, Allison, et al., "Model-driven Application Design for a Campus Calendar Network", IdeAlliance XML 2004 Conference, CiteSeer, 2004, pp. 1-24.*

Dawson, Frank, "Emerging Calendaring and Scheduling Standards", Computer, vol. 30, Issue 12, Dec. 1997, pp. 126-128.*

Prasad, Sushil K., et al., "Enforcing Interdependencies and Executing Transactions Atomically Over Autonomous Mobile Data Stores Using SyD Link Technology", ICDCSW '03, IEEE, © 2003, pp. 1-7.*

Mustacoglu, Ahmet Fatih, et al., "Internet Calendaring and Scheduling Core Object Specification (iCALENDAR) Compatible Collaborative Calendar-Server (CCS) Web Services", CTS 2006, Las Vegas, NV, May 14-17, 2006, pp. 12-17.*

D'Roza, Thomas, et al., "An overview of location-based services", BT Technology Journal, vol. 21, No. 1, Jan. 2003, pp. 20-27.*

Prasad, Sushil K., et al., "Implementation of a Calendar Application Based on SyD Coordination Links", IPDPS '03, Nice, France, Apr. 22-26, 2003, pp. 1-8.*

Tullio, Joe, et al., "Augmenting Shared Personal Calendars", UIST '02, Paris, France, Oct. 27-30, 2002, CHI Letters, vol. 4, Issue 2, pp. 11-20.*

"Undupe," Stevens Creek Software, 1997-2007, 5 pages.

"Duplicate Appointments Eliminator Add-In for Outlook", Sperry Software, 2008, 2 pages.

* cited by examiner

US 8,041,725 B2

ELIMINATING DUPLICATE AND INVALID CALENDAR ITEMS FROM END USER CALENDARS USING A UNIQUE ENTRY IDENTIFIER (UEID)

BACKGROUND OF THE INVENTION

The present invention relates to the field of calendaring software, and, more particularly, to eliminating duplicate and invalid calendar items from end user calendars.

Calendaring systems are used in many contexts to assist users in maintaining their schedules. These calendaring systems often include collaboration mechanisms to expose one user's calendar to others for viewing, modifying, and/or deleting calendar entries. Additionally, calendaring systems are often used to coordinate attendance and timing of an event having multiple attendees, such as a meeting. Calendaring systems can have server side and/or client-side components depending upon implementation specifics. Either way, calendars are maintained on a user specific basis. That is, a unique user identifier of a calendar owner is associated with a calendar identifier within a data store, such as a relational database management system (RDBMS) that maintains calendar data. Each calendar entry also is associated with a unique calendar identifier, (i.e., calendar identifier is a foreign key in a calendar entry table). At present, calendar entries are not uniquely identified across multiple calendars and are only unique within a given calendar. No unique identifier for a calendar event is currently is shared among a set of calendars, each of which includes an entry for the calendar event.

A lack of a unique identifier for a commonly referenced calendar entry results in numerous problems, which include duplicate entries being mistakenly placed in a calendar and results in a calendar containing "orphan" or invalid entries. Present solutions exist that perform post-processing actions (e.g., UNDUP by STEVENS CREEK, DUPLICATE APPOINTMENT ELIMINATOR ADD-IN for OUTLOOK by SPERRY SOFTWARE, etc.). Post-processing actions attempt to determine if a calendar entry is a duplicate of another based upon meeting properties. When an original meeting is altered, the "duplicate" does not possess the same meeting properties and often will not be properly detected by a post-processing operation. Further, post processing operations do not provide calendaring applications (server-side and client-side) with leverage to coordinate changes to a "shared" calendar entry, which is implemented as an unsynchronized series of independent records stored within local calendars.

To illustrate through an example, public meetings (e.g., calendar events) can be distributed to a set of attendees via an email message. Recipients of this email message are presented with an option to add-to-calendar. Selecting this option creates a new calendar entry in the recipient's calendar database. If the recipient inadvertently presses the button more than once either due to user finger check or redistribution of the email, multiple calendar entries appear on the users' calendar for the same meeting. When a meeting is altered and is redistributed within a new email which contains an option to add-to-calendar, the original meeting entry(s) become orphans because pressing the option to add the new modified entry does not affect the original entry. When automated programmatic events (e.g., reminders, alerts, user notifications) and reports are executed based upon the redundant calendar entries, users are further mislead or frustrated by the "incorrect" notifications/reports.

An onus can be placed upon an end user to self-monitor their calendar to manually insure that redundant entries have been pruned from their calendar and/or to ensure that multiple acceptances of a common meeting are not made (e.g., selecting an accept button twice and/or accepting a meeting request for a common meeting included in different email messages). This solution is inelegant and prone to mistakes, especially when multiple users (a calendar owner, secretary, boss, etc.) have access to updating a user's calendar.

Another possible solution places a burden of including logic within a meeting request message that ensures that no existing entry exists for that meeting within the end-user's calendar before an add-entry action is performed. This solution requires a sender of a meeting requests possesses more technical expertise than many users have. Even if the sender has the requisite level of expertise (or has access to a plug-in that facilitates adding duplicate checking logic for outbound messages), most senders would not be incentivized to circumvent a recipient experienced problem that results from a "recipient induced error". Simply put, the sender of the calendar entry doesn't generally suffer when a recipient duplicates a meeting entry in the recipient's local calendar, and may generally consider any such problems outside their scope of concern.

DETAILED DESCRIPTION OF THE INVENTION

Figure 1:
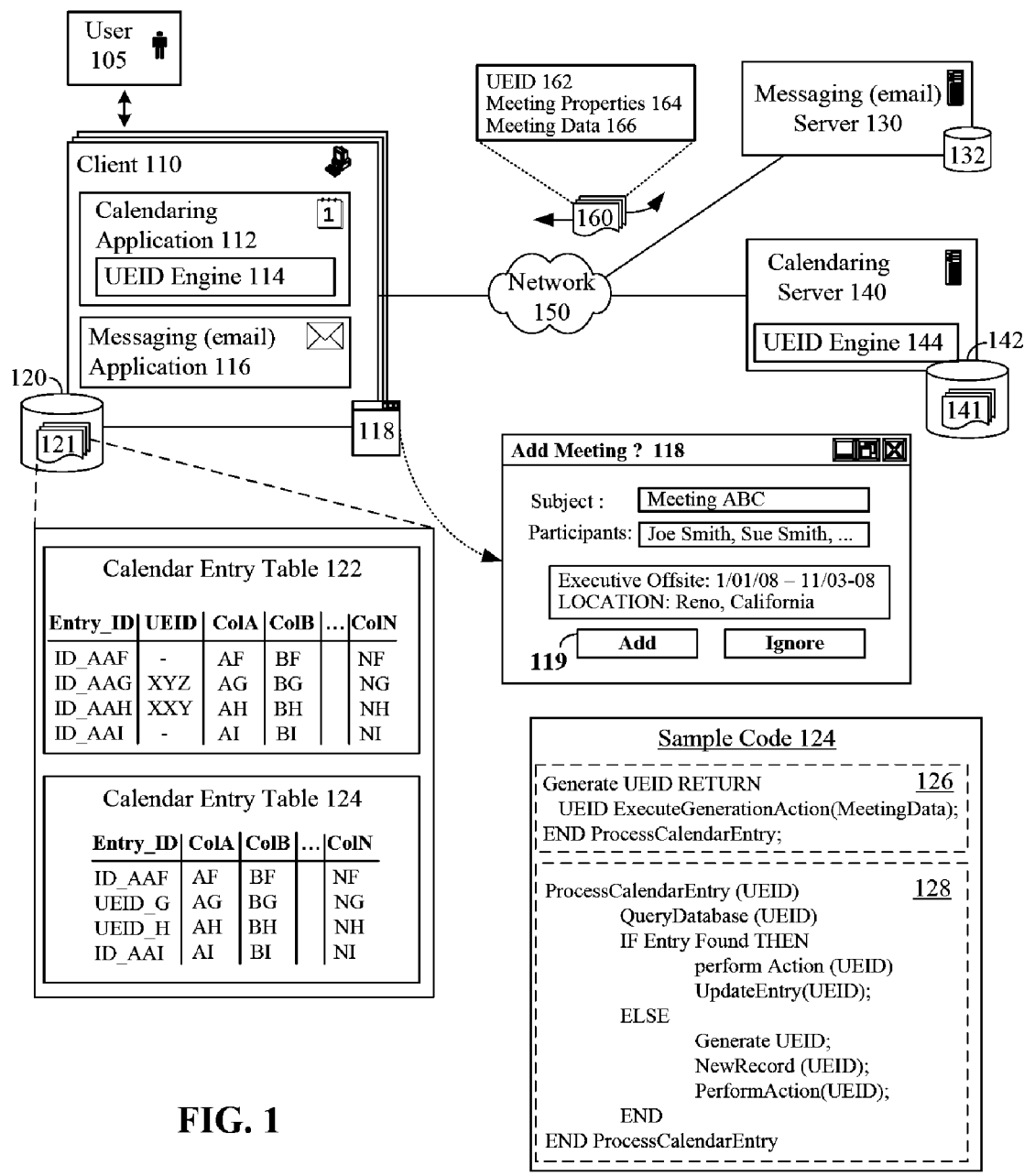
FIG. 1 is a schematic diagram of a system in which calendar entries (e.g., meetings) shared among a set of participants, where the entries are locally managed in different user specific calendar databases, each of which associates a common unique entity identifier (UEID) with the calendar entry in accordance with an embodiment of the inventive arrangements disclosed herein.

The present invention uses a unique entry identifier (UEID) for a calendar entry that is conveyed to multiple recipients and stored/managed by multiple local calendaring database. In one embodiment, the UEID can be the primary key of the record, which is generated based upon meeting properties to ensure that the same UEID value is generated for the same calendar entry regardless of what client is generating the UEID value. In another embodiment, the UEID can be implemented as a "virtual foreign key" that is added to a calendar event record. That is, the calendar entry will still have a locally unique entry ID that is locally used and will also include the UEID value. Unlike a true foreign key that uniquely identifies an entry in a related database table, the UEID in a "virtual foreign key" embodiment is a "key" in a loosely coupled system of multiple local calendaring databases, one for each user. Currency among these localized calendar databases can be maintained through conveyed messages, such as email messages having calendaring specific controls/logic/metadata embedded within the email messages. Duplication of calendar entries can be avoided by having a calendaring system check for the UEID before adding an entry to a localized database. Additionally, coordination of calendaring entry updates and changes among participants can be facilitated by always including the UEID within messages (conveyed among a distributed set of users, each having a user-specific calendar database) related to the calendar entry.

The present invention may be embodied as a method, system, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 in which calendar entries (e.g., meetings) shared among a set of participants, where the entries are locally managed in different user specific calendar databases, each of which associates a common unique entity identifier (UEID) with the calendar entry in accordance with an embodiment of the inventive arrangements disclosed herein. In system 100, multiple clients 110 can be connected to network 150, to which a messaging server 130 and/or a calendaring server 140 can also be connected. Each client 110 can include a calendaring application 112, which stores user 105 specific calendaring data 121 in a data store 120. The calendaring data 121 can include multiple calendar entries, each having a unique identifier. The client 110 can also include a messaging application 116, which is able to exchange messages 160 between other clients 110.

Each of the clients 110 can send/receive messages 160 containing calendaring information 162-166 to other applications. The exchanged calendar information 162-166 can be for shared calendar events, such as meetings. The shared calendar events can having multiple attendees, each maintaining calendaring data 121 for the shared calendar events independent of the others. In other words, the calendaring applications 112 are able to perform actions upon a localized version of calendaring data 121 in a stand-alone fashion and/ or independent of actions performed by other calendaring applications 112. In one embodiment, one or more calendaring actions can be performed by the calendaring application 112 when the client 110 is offline (not connected to network 150). In another embodiment, one more of the users 105 can perform server 140 assisted calendaring actions upon a networked version of calendaring data 141, which is still data 141 specific to a user 105.

The messages 160 can be handled by a messaging application 116 which can be either integrated, partially integrated, and/or independent of the calendaring application 112. The messaging application 116 can include an email application, an instant messaging application, and the like. Regardless of implementation choices, messages 160 can be sent from the clients 110, which include calendaring data 162-166 derived from calendaring information 121 used by the calendaring application 112. Messages 160 can also be received and processed by the clients 110, which results in updates to the calendaring information 121 used by the calendaring application 112.

Shared calendar entries can each be associated with the UEID 162, which is a unique value used by all calendaring applications 112 for that entry. A UEID engine 114, 142 can ensure calendaring operations involving the shared calendar entry use the UEID properly. As shown by of sample code 124, for example, a process record 128 operation can unique identify the record based on a UEID parameter. The process record operation can add a new entry to the calendar application that is associated with the UEID, can delete a calendar entry associated with the UEID, and/or can modify a calendar entry associated with the UEID. Additionally, when a user selects an operation 119 from within a user interface 118, such as adding a calendar entry to the local data store 120, existing entries can be compared against the UEID to ensure duplicate entries are not created and to ensure proper identification occurs when an entry is to be modified or deleted.

In one embodiment, the UEID engine 114,144 can generate values for the UEID 162 in a consistent fashion based upon meeting properties 164 or data 166. For example, sample code 124 shows a generate UEID operation 126 that consistently generates a UEID based upon meeting properties 164 and/or meeting data 166. For example, the UEID 162 can be generated based at least in part upon a chairperson's name, a meeting location, a meeting time, a meeting subject, etc. Any of a variety of event specific properties 164 or data 166 can be used to generate the UEID 162 and the invention is not to be construed as limited to any particular generation elements. It is important that the UEID 162 generated by operation 126 is unique across an enterprise (set of clients 110, system of devices/application for which calendaring information is exchanged) and not just unique within a local data store 120, which is the case for conventional entry identifiers. In one embodiment, after a UEID has been initially generated, it can be conveyed 162 within messages 160 associated with the shared calendar event.

Tables 122 and 124 are sample tables showing two different approaches for associating a UEID 160 with calendar entries. Table 122 treats the UEID as an optional "virtual foreign key" that is associated with shared calendar entries. That is, each calendar entry of table 122 has a locally generated identifier (EID) that is unique only to the local calendar system (data store 120). Entries of table 122 that are shared calendar entries also have a UEID value stored, which is unique and common for all calendaring systems able to exchange messages 160 used to update local calendaring information 121.

Table 124 maintains only one identifier for an entry. This identifier is the UEID for shared entries. In one embodiment, an algorithm (operation 126) used to generate the UEID can be utilized to generate all entry identifiers, whether associated with a shared entry or not. This implementation choice can be beneficial to ensure consistency of identifiers and to enable a user 105 to share a previously local calendar entry without modifying its identifier. In another embodiment, local identifiers can be generated for non-shared calendar entries and "enterprise" unique identifiers can be reserved for shared entries. Using UEIDs only for shared entries can beneficially conserve space in a data store 120 and can minimize processing when generating entry identifiers.

In one embodiment, the calendaring server 140 can facilitate the conveyance, sharing, and/or management of calendaring events. For example, the calendaring server 140 can function as a Web server, which provides a Web calendar interface to one or more clients 110, which can be rendered in a browser. The calendaring server 140 can maintain user-specific calendar data 141 within data store 142, which is approximately equivalent to the data 121 locally maintained by one or more clients 110. The data 121, 141 may be optionally synchronized and data maintenance actions (e.g., archiving, for example) may be optionally implemented. In another embodiment, peer-to-peer communications can be used to convey calendaring information (e.g., data 164, 166) between clients 110 without assistance of server 140.

In one embodiment, messaging server 130 can facilitate the exchange of messages 160. In another embodiment, peer-to-peer communications can be used to exchange messages 160 between clients 110 without assistance of server 130. Salient characteristics regarding UEID 162 and its maintenance and use among a set of user specific calendars (121, 141) is the same regardless of whether server 130 or 140 involvement is present in the system 100 or not.

As used herein, a meeting can be defined as an occurrence or event involving a set of one or more users. A calendaring event or entry, which can be a meeting, can be any occurrence which can be scheduled within a calendaring application 122 for a specific time slot. Each calendaring entry, which includes meeting entries, can have an associated location, time, purpose, and/or other attributes.

The calendaring application 122 can be implemented as an integrated component of a collaboration suite or can be a stand-alone program. The collaboration suite can optionally include a component for the messaging application 116. For example, the calendaring application 112 can include, but is not limited to, LOTUS SAMETIME, LOTUS NOTES, I-CALENDAR, SHAREPOINT, OFFICE LIVE, OUTLOOK, MS PROJECT, and the like. The messaging application 116 can be optionally linked to one or more communication or messaging servers 130, which include email servers, instance messaging servers, fax servers, automated dialing servers, and the like.

The computing device(s) 110 and server(s) 130, 140 can include a combination of hardware/software/firmware for performing the programmatic actions and functions described herein. Each of the devices 110, 130, 140 can include an operating system. Further, the devices 110, 130, 140 can be implemented as virtual computing devices using a virtualization technology, which can be actually implemented upon a set of one or more physical devices. Client(s) 110 can include, for example, a personal computer, a notebook computer, a thin client, a kiosk, an embedded computing device, a smart phone, a personal data assistant, a wearable computer, an electronic gaming device, an internet appliance, a media player, a navigation device, and the like. Server(s) 130, 140 can include a set of one or more servers, virtual or physical. In one embodiment, the server(s) 130, 140 can be implemented in a cluster or another redundant fashion, which enhances a scalability and a resiliency of the solution presented in system 100.

Network 150 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 150 can include local components and data pathways necessary for communications to be exchanged among computing device components and between integrated device components and peripheral devices. The network 150 can also include network equipment, such as routers, data lines, hubs, and intermediary servers which together form a packet-based network, such as the Internet or an intranet. The network 103 can further include circuit-based communication components and mobile communication components, such as telephony switches, modems, cellular communication towers, and the like. The network 150 can include line based and/or wireless communication pathways.

Data stores 120, 130, and 140 can each be a physical or virtual storage spaces configured to store digital information. The data stores 120, 130, and 140 can be physically implemented within any type of hardware including, but not limited to, a magnetic disk, an optical disk, a semiconductor memory, a digitally encoded plastic memory, a holographic memory, or any other recording/storage medium. Each of data stores 120, 130, and 140 can be a stand-alone storage unit as well as a storage unit formed from one or more physical devices. Additionally, information can be stored within the data stores 120, 130, and 140 in a variety of manners. For example, information can be stored within a database structure or can be stored within one or more files of a file storage system, where each file may or may not be indexed for information searching purposes. Further, the data stores 120, 130, and 140 can optionally utilize one or more encryption mechanisms to protect stored information from unauthorized access.

It should be understood that the sample code 124, interface 118, and tables 122, 124 are presented for illustrative purposes only and are not intended to be construed as implementation limitations.

Figure 2:
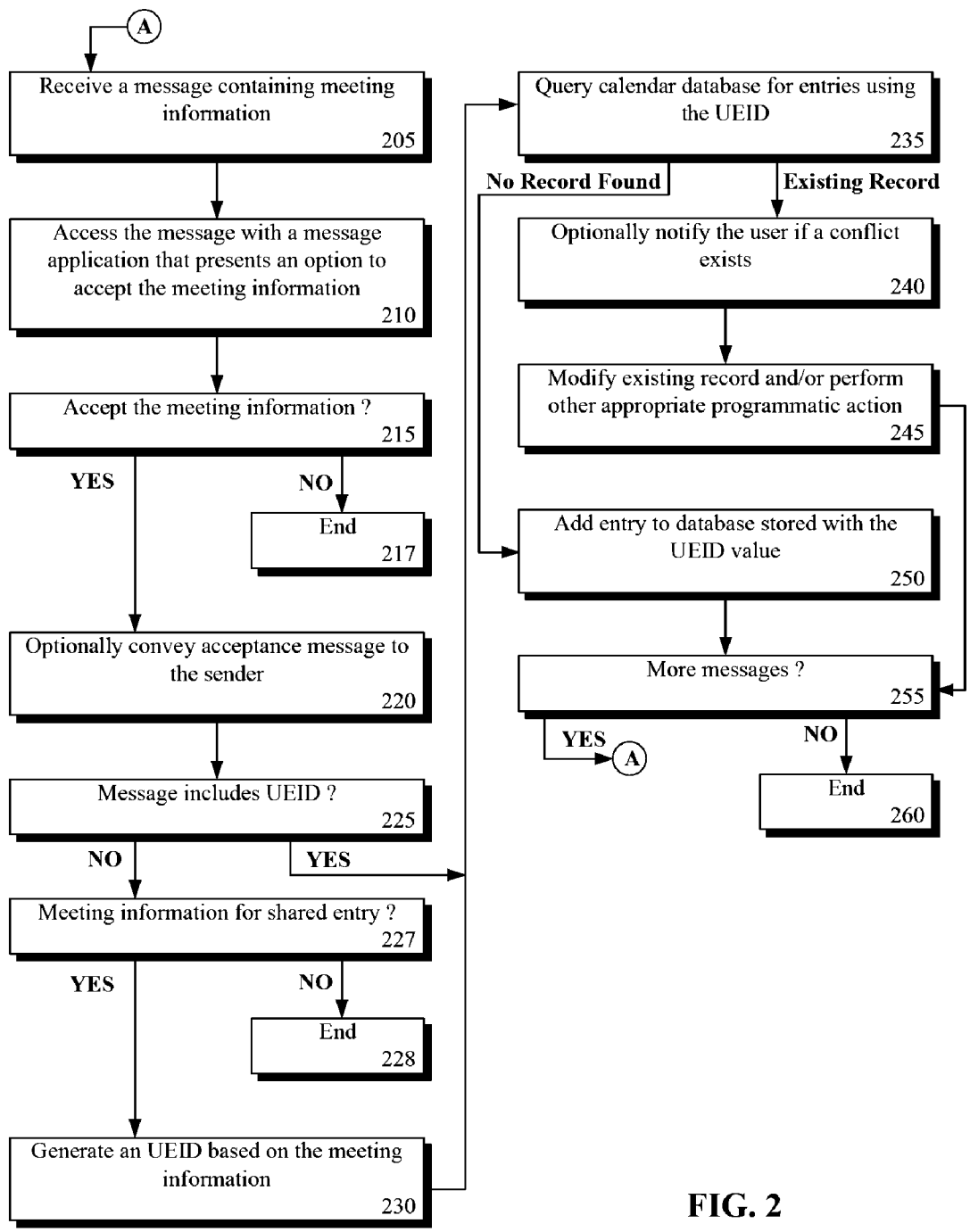
FIG. 2 is a flow chart of a method for utilizing a UEID for shared calendar events in accordance with an embodiment of the inventive arrangements disclosed herein.

FIG. 2 is a flow chart of a method 200 for utilizing a UEID for shared calendar events in accordance with an embodiment of the inventive arrangements disclosed herein. The method 200 can be performed in context of system 100.

Method 200 can begin in step 205, where a message containing meeting information can be received. The message can be an email message, an instant message, a calendaring system specific message, and the like. In step 210, the message can be accessed with a messaging application. During this access, a user can be presented with an option to accept the meeting information. Accepting the meeting information can signify that the information of the message will have a programmatic effect on calendaring information stored for the user. In step 215, the user can elect to accept the meeting information and proceed to step 220. When the meeting information is denied (not accepted) in step 215, the method 200 can end, as shown by step 217. In step 220, a message of the acceptance of the meeting information can be optionally conveyed to the sender of the message.

Assuming acceptance of the meeting information, the message can be searched to determine whether it includes a UEID, as shown by step 225. When no UEID is present, a determination can be made as to whether the meeting information is for a shared meeting, in step 227. In some implementations, it can be assumed that when meeting information is conveyed within messages that the meeting information is by default for a shared meeting, in which case step 227 can be skipped. In other implementations, the messages can be used to communicate local calendaring information between applications (as opposed to communicating calendaring information between different users), in which case step 227 is necessary. When the meeting information is not for a shared meeting, the method can end in step 228. Assuming a shared entry and a lack of the UEID within the message itself, a UEID can be generated based upon message info included within the message, as shown by step 230.

In step 235, calendar entries in a user specific calendar database can be queried based upon the UEID value. When a record having the UEID is found, the user can be optionally notified that a potential conflict with records exists, as shown by step 240. In step 245, an existing record of the calendaring database having the UEID can be modified in accordance with the accepted meeting information. Other suitable programmatic actions can also occur, such as ignoring the meeting information should a current record already containing the meeting information exist, as may be the case when an acceptance option is selected too many times (i.e. an event that conventionally resulted in duplicate calendar entries). When no entry having the UEID is found in the database, step 250 can execute where a new entry can be added to the calendar database based upon the accepted meeting information. The UEID value can be stored for the new entry. If more messages are to be processed in step 255, the method can loop to step 205. Otherwise the method can end in step 260.

The diagrams in FIG. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for updating structured calendar data comprising:
   receiving a message containing data for a shared calendar entry, wherein a shared calendar entry is a content item maintained within records of a plurality of different user specific electronic calendars, wherein each of the plurality of different user specific electronic calendars are functionally independent from any of the other user specific electronic calendars, wherein each of the user specific electronic calendars are maintained and utilized by a plurality of functionally independent calendaring applications, each executing on a one of a plurality of different computing devices, each utilizing a unique record set within which calendar entries are maintained, such that each of the different user specific calendars utilizes its own unique record set, each including a record for the shared calendar entry;
   receiving an option to accept the data in the message;
   accepting the data by selecting the option;
   determining a unique entry identifier for the shared calendar entry;
   querying a stored set of structured calendar data wherein said stored set of structured calendar data is one of the unique record sets for a specific one of the different user specific calendars using the unique entry identifier;
   when no entry in the stored set is found during the querying that matches the unique entry identifier, initializing at least one programmatic action to create a new calendar entry having the unique entry identifier that is to be stored as part of the structured calendar data of said one of the unique record sets; and
   when an entry in the stored set is found during the querying that matches the unique entry identifier, initializing at least one programmatic action to process data of the shared calendar entry in a manner that ensures that only one calendar entry of the stored set of structured calendar data of said one of the unique record sets is associated with the unique entry identifier.

2. The method of claim 1, wherein the received message is received from a messaging application of a client that is one of the different computing devices, which also executes one of the plurality of different functionally independent calendaring applications, wherein said messaging application is independent of the calendaring application.

3. The method of claim 1, further comprising:
   presenting a user interface within an messaging application having an option to accept or deny the data relating to the shared calendar entry; and
   performing processing actions to update the stored set of structured calendar data within a local data store responsive to a user selection of the option indicating acceptance of the data relating to the shared calendar entry.

4. The method of claim 1, further comprising:
   identifying semantic data of the shared calendar entry; and
   executing an algorithm driven by the semantic data to automatically generate the unique entry identifier, wherein each execution of the algorithm given the same semantic data produces the same unique entry identifier.

5. The method of claim 1, wherein the message is an email message, and wherein the data comprises the unique entry identifier, which is a value that uniquely identifies as structured record for the shared entry as stored in a calendaring database of a system that sent the message.

6. The method of claim 1, further comprising:
   generating a message that contains data relating to the shared calendar entry;
   within the message, uniquely identifying the shared calendar entry using the unique entry identifier; and
   conveying the message over a network that is directed towards at least one user associated with the shared calendar entry.

7. A computer program product comprising a non-transitory computer useable storage medium having computer usable program embodied therewith, wherein the computer usable program code when executed on a computer causes the computer to:
   receive a message containing data for a shared calendar entry, wherein a shared calendar entry is a content item maintained within records of a plurality of different user specific electronic calendars, wherein each of the plurality of different user specific electronic calendars are functionally independent from any of the other user specific electronic calendars, wherein each of the user specific electronic calendars are maintained and utilized by a plurality of functionally independent calendaring applications, each executing on a one of a plurality of different computing devices, each utilizing a unique record set within which calendar entries are maintained, such that each of the different user specific calendars utilizes its own unique record set, each including a record for the shared calendar entry;
   receive an option to accept the data in the message;
   accept the data by selecting the option;
   determine a unique entry identifier for the shared calendar entry;
   query a stored set of structured calendar data wherein said stored set of structured calendar data is one of the unique record sets for a specific one of the different user specific calendars using the unique entry identifier;
   when no entry in the stored set is found during the querying that matches the unique entry identifier, initialize at least one programmatic action to create a new calendar entry having the unique entry identifier that is to be stored as part of the structured calendar data of said one of the unique record sets; and
   when an entry in the stored set is found during the querying that matches the unique entry identifier, initialize at least one programmatic action to process data of the shared calendar entry in a manner that ensures that only one calendar entry of the stored set of structured calendar data of said one of the unique record sets is associated with the unique entry identifier.

8. The computer program product of claim 7, wherein the received message is received from a messaging application of a client that is one of the different computing devices, which also executes one of the plurality of different functionally independent calendaring applications, wherein said messaging application is independent of the calendaring application.

9. The computer program product of claim 7, wherein the computer usable program code when executed on a computer causes the computer to:
   present a user interface within an messaging application having an option to accept or deny the data relating to the shared calendar entry; and
   perform processing actions to update the stored set of structured calendar data within a local data store responsive to a user selection of the option indicating acceptance of the data relating to the shared calendar entry.

10. The computer program product of claim 7, wherein the computer usable program code when executed on a computer causes the computer to:
    identify semantic data of the shared calendar entry; and
    execute an algorithm driven by the semantic data to automatically generate the unique entry identifier, wherein each execution of the algorithm given the same semantic data produces the same unique entry identifier.

11. The computer program product of claim 7, wherein the message is an email message, and wherein the data comprises the unique entry identifier, which is a value that uniquely identifies as structured record for the shared entry as stored in a calendaring database of a system that sent the message.

12. The computer program product of claim 7, wherein the computer usable program code when executed on a computer causes the computer to:
    generate a message that contains data relating to the shared calendar entry;
    within the message, uniquely identify the shared calendar entry using the unique entry identifier; and
    convey the message over a network that is directed towards at least one user associated with the shared calendar entry.

13. A system comprising hardware and software that is stored in a non-transitory storage medium, wherein when the hardware is operable to execute the software causing the system to:
    receive a message containing data for a shared calendar entry, wherein a shared calendar entry is a content item maintained within records of a plurality of different user specific electronic calendars, wherein each of the plurality of different user specific electronic calendars are functionally independent from any of the other user specific electronic calendars, wherein each of the user specific electronic calendars are maintained and utilized by a plurality of functionally independent calendaring applications, each executing on a one of a plurality of different computing devices, each utilizing a unique record set within which calendar entries are maintained, such that each of the different user specific calendars utilizes its own unique record set, each including a record for the shared calendar entry;
    receive an option to accept the data in the message;
    accept the data by selecting the option;
    determine a unique entry identifier for the shared calendar entry;
    query a stored set of structured calendar data wherein said stored set of structured calendar data is one of the unique record sets for a specific one of the different user specific calendars using the unique entry identifier;
    when no entry in the stored set is found during the querying that matches the unique entry identifier, initialize at least one programmatic action to create a new calendar entry having the unique entry identifier that is to be stored as part of the structured calendar data of said one of the unique record sets; and
    when an entry in the stored set is found during the querying that matches the unique entry identifier, initialize at least one programmatic action to process data of the shared calendar entry in a manner that ensures that only one calendar entry of the stored set of structured calendar data of said one of the unique record sets is associated with the unique entry identifier.

14. The system of claim 13, wherein the received message is received from a messaging application of a client that is one of the different computing devices, which also executes one of the plurality of different functionally independent calendaring applications, wherein said messaging application is independent of the calendaring application.

15. The system of claim 13, wherein the hardware is operable to execute the software causing the system to:
    present a user interface within an messaging application having an option to accept or deny the data relating to the shared calendar entry; and
    perform processing actions to update the stored set of structured calendar data within a local data store responsive to a user selection of the option indicating acceptance of the data relating to the shared calendar entry.

16. The system of claim 13, further comprising:
    identifying semantic data of the shared calendar entry; and
    executing an algorithm driven by the semantic data to automatically generate the unique entry identifier, wherein each execution of the algorithm given the same semantic data produces the same unique entry identifier.

17. The system of claim 13, wherein the message is an email message, and wherein the data comprises the unique entry identifier, which is a value that uniquely identifies as structured record for the shared entry as stored in a calendaring database of a system that sent the message.

18. The system of claim 13, wherein the hardware is operable to execute the software causing the system to:
    generate a message that contains data relating to the shared calendar entry;
    within the message, uniquely identify the shared calendar entry using the unique entry identifier; and
    convey the message over a network that is directed towards at least one user associated with the shared calendar entry.

* * * * *